June 11, 1957 K. A. BUSCHE 2,795,710
MOVEMENT FOR IMPARTING INCREMENTAL MOTION TO A SHAFT
Filed Nov. 29, 1954 2 Sheets-Sheet 1

INVENTOR:
Kenneth A. Busche
By Herbert E. Metcalf
His Patent Attorney

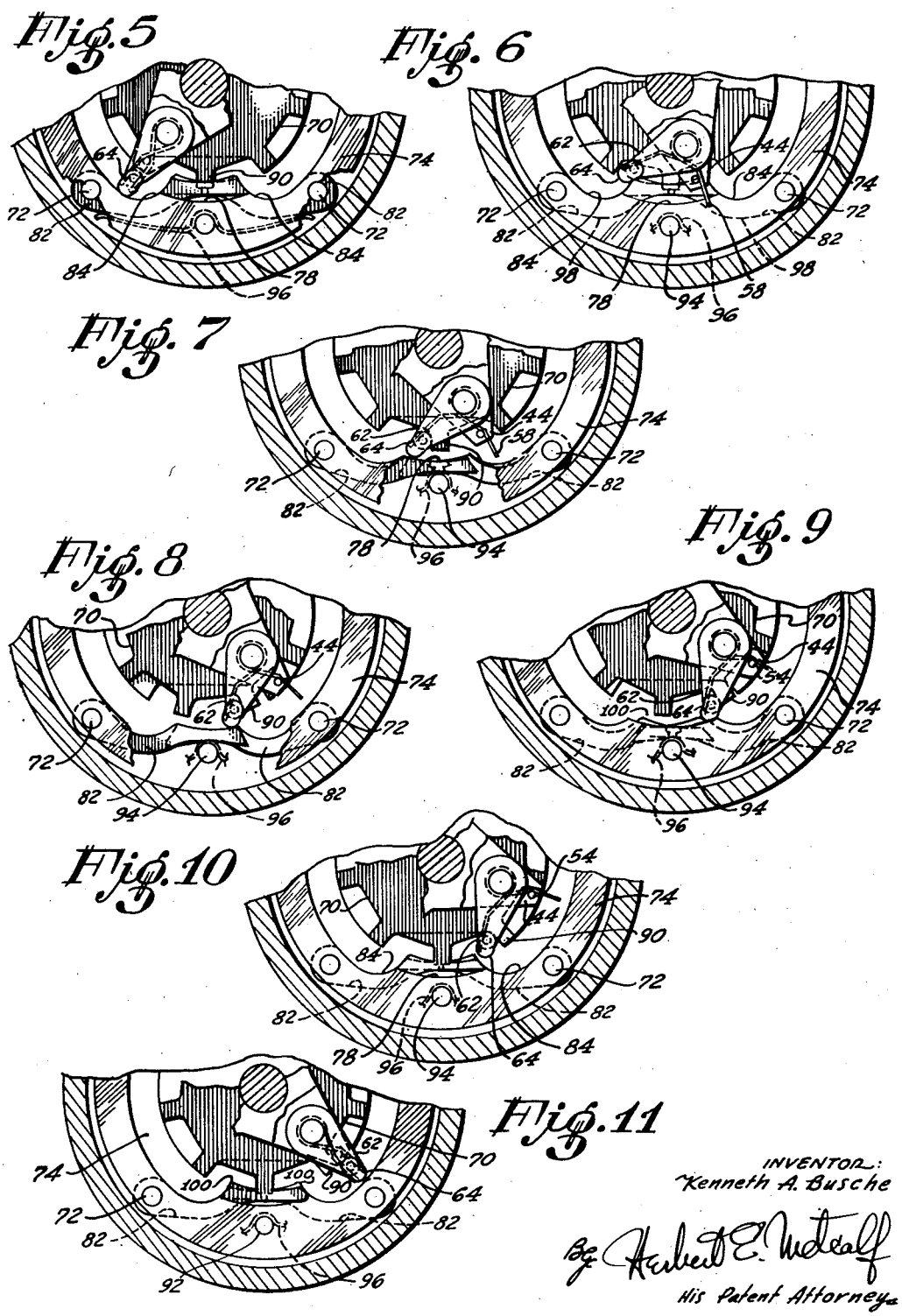

United States Patent Office 2,795,710
Patented June 11, 1957

2,795,710

MOVEMENT FOR IMPARTING INCREMENTAL MOTION TO A SHAFT

Kenneth A. Busche, Los Angeles, Calif., assignor to Northrop Aircraft, Inc., Hawthorne, Calif., a corporation of California Application November 29, 1954, Serial No. 471,578

19 Claims. (Cl. 310—49)

This invention has to do with electrically energized instruments and more particularly with incremental or stepper motors.

Stepper motors are used to control accurately functioning mechanisms such as computing devices, servo systems, and electrical relay systems that may be found in communication equipment and similar applicable structure.

Some stepper motors require structure that rotates a shaft through a limited but accurately defined path of travel and an electrical signal may not be immediately or subsequently transmitted unless the defined distance of travel is completed.

Devices of the kind to which this invention relate should operate on the electrical power provided, be so constructed that they may be readily incorporated in place of other previously used devices in a wide variety of equipment and should be readily adapted to the special needs of whatever type of equipment the device is to be used.

Therefore the principal object of this invention is to provide an electrical pulse actuated stepper motor that will operate very accurately for an extended period of time without missing pulses.

Another object of this invention is to provide an electrical pulse actuated stepper motor capable of use in a variety of equipment, that may be readily actuated in one or the other direction or alternately in one direction and then the other or in any combination thereof.

Figures 5 to 11 inclusive are schematic views illustrating in sequence the operation of the stepper motor.

Figure 1:
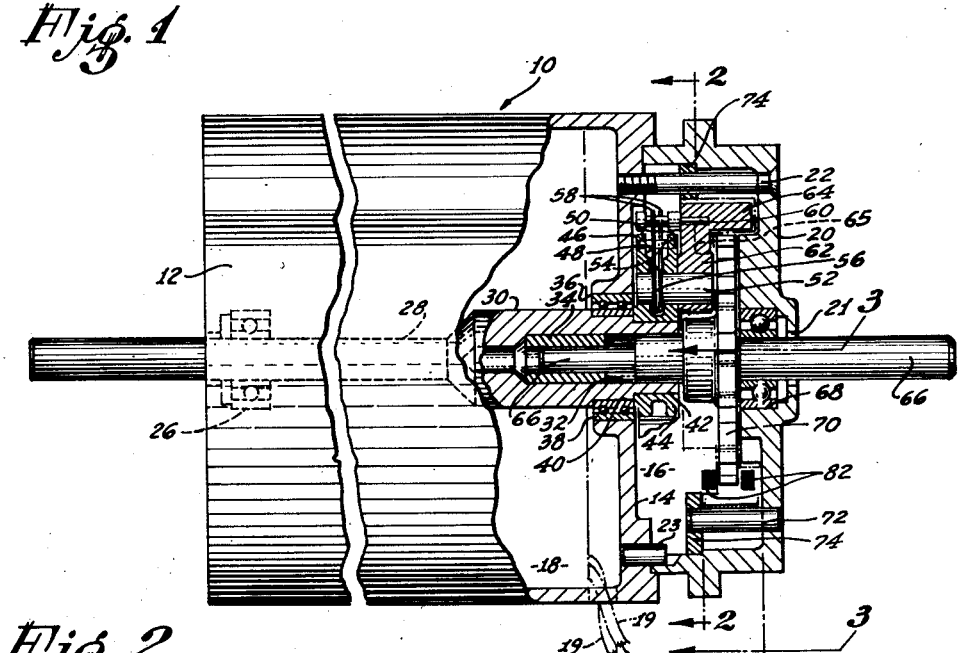
Figure 1 is a fragmentary, cross-sectional view illustrating a stepper motor having embodied therein the present invention.

Referring to the drawings for a detailed description of the present invention, Figure 1 illustrates a stepper motor 10, certain of the operational parts of which are mounted in a cylindrical housing 12 having a wall 14 that separates a compartment 16 from an electrically pulse energized torque motor 18; the latter being energized by electrical leads 19. The compartment is enclosed by a cap 20, having a centrally located opening 21 therein, that is secured to wall 14 by a plurality of screws 22 and guided into the proper position by a guide pin 23.

The operational parts, other than the torque motor 18, for the most part, are located in compartment 16. However, extending through housing 12 and supported at one end therein by a ball bearing 26 is an elongated armature 28 that is rotatably actuated by torque motor 18.

Armature 28 has an elongated enlargement 30 on that end next adjacent to wall 14 and an elongated opening 32 therein to receive in part, a bearing bushing 34. The wall 14 has a centrally located opening therein, coaxial with opening 21, defined by an annular shoulder 36 onto which is pressed or otherwise secured a ball bearing 38 that has for its purpose the supporting of that end of the armature 28 in opposed relationship to bearing 26. The enlargement 30 is further reduced to present a portion 42, that is located in compartment 16, on which is secured a triangular shaped crank 44.

Each of the apexes 46 of the triangular shaped crank 44 have irregular shaped slots 48 formed therein that results in there being a pair of spaced apart fingers 50. Rigidly secured in the fingers, spanning the distance therebetween and extending outwardly from one side of the crank toward the cap 20 is a pin 52. Also rigidly secured in the fingers, spanning the distance therebetween and spaced from pin 52 is a second pin 54. Coiled about pin 52 is a spring 56 that has a pair of spaced arms 58 integral therewith. The arms 58 are held in a spaced apart relationship by virtue of the fact that one is disposed on one side of pin 54 and one on the other in opposed relationship to each other. The arms 58, are further held in the aforementioned described position by latch pin 60.

Figure 2:
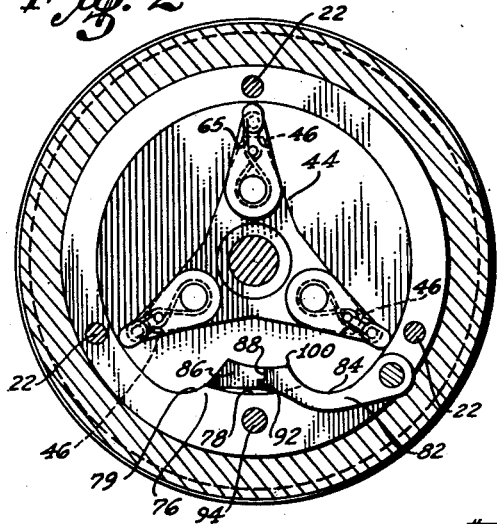
Figure 2 is a transverse, cross-sectional view taken on irregular lines 2—2 in Figure 1 looking in the direction indicated and illustrating the crank, latch assembly, and one pawl.

The latch pin 60 is pressed or otherwise secured to latch 62; the latter having a projection 64 thereon and being rotatable about pin 52. The spring 56, with its arms 58 disposed one on each side of pin 54 and latch pin 60, continuously urges the latch 62 to the extended position as viewed in Figure 2 of the drawings. Formed in the sides of the latch are arcuate depressions 65.

Extending into opening 32, freely rotatable in bearing bushing 34 and supported thereby is a driven shaft 66. Shaft 66 is also supported by and freely rotatable in a ball bearing 68 secured in cap 20 and extends outwardly through opening 21. Intermediate the ends of shaft 66 and rigidly secured thereto is a multi-toothed sprocket wheel 70. The projection 64 and sprocket wheel 70 lie in substantially the same plane.

Rigidly secured within compartment 16 by silver solder or other equally applicable structure is a cam ring 74. The cam ring 74 and latch 62 lie in substantially the same plane. Cam ring 74 has an enlarged portion 76 thereon that has an arcuate cam surface depression 78 formed therein and arcuate cam surfaces 79 formed in the sides thereof that guide the latch 62 through a portion of its path of travel. Pivotally secured to cap 20 by pins 72 are opposed irregular shaped and identical pawls 82 that are held in the proper position by spacers 83. Each of the pawls 82 has an arcuate cam face 84 therein that curves from the cam ring 74 toward the sprocket wheel 70 in the manner illustrated in Figure 3 of the drawings. The cam surfaces 79 and cam faces 84 are substantially identical in configuration and in substantially the same plane. Further pawls 82 have a projection 86 thereon which is a continuation of the cam face 84. The ends 88, in opposed relationship to the pivot pins 72, of the pawls 82 are in a spaced apart relationship resulting in there being a gap into which one of the teeth 90 of the sprocket wheel 70 is disposed when the latter is locked against rotation. Extending from end 88 is a stop projection 92. The various elements comprising the pawls 82 may be viewed by referring to Figures 2 to 11 inclusive.

Figure 3:
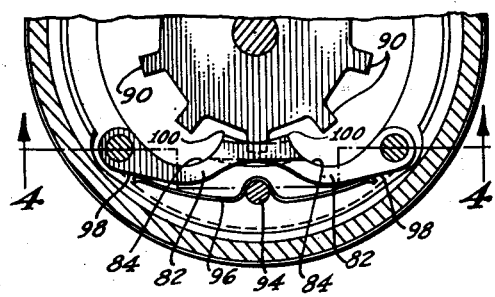
Figure 3 is a fragmentary, cross-sectional view taken on lines 3—3 in Figure 1 looking in the direction indicated and illustrating the sprocket wheel in a locked position.
Figure 4:
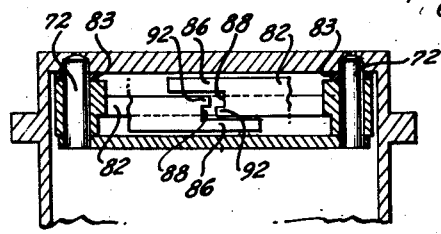
Figure 4 is a fragmentary, cross-sectional view taken on irregular lines 4—4 in Figure 3 looking in the direction indicated.

Partially embracing a pin 94 is an elongated spring 96 that bears against the sides 98 of the pawls 82 to continuously urge the latter toward the sprocket wheel 70 and into a tooth 90 engaging position in the manner illustrated in Figure 3 of the drawings.

The operation of the stepper motor is as follows. The torque motor 18 is energized through leads 24 to rotate armature 28 and crank 44. The rotation of the aforementioned mechanisms results in rotating the latch 62 and the projection 64 integral therewith to the position illustrated in Figure 5 of the drawings. Continuing rotation brings the projection 64 into contact with cam surfaces 79 on the cam ring 74 and urges the former to a position between two teeth 90 on sprocket wheel 70. This positioning is in opposition to the urging of spring 56. Due to the pawls 82 having a cam surface 84 similar to that of cam surfaces 79 the pawl 82 adjacent projection 64 is not, at this stage of operation, disturbed. It will be noted in Figure 6 of the drawings that the crank 44 has progressed through the path of rotation a greater distance than the latch 62. The arcuate depressions 65 formed in the sides of the latch 62 enable the latter to clear the corners 100 of the pawls 82. As the latch 62 and projection 64 progress further through the path of rotation, the latter is urged to follow the contour of cam ring 74 and cam surface or depression 78 which results in projection 64 contacting one pawl 82 adjacent corner 100 and the projection 86 on the other pawl 82. Under the urging of spring 56 the projection 64 and latch 62 are only partially extended to urge the pawls 82, against the urging of spring 96 from the sprocket wheel 70 locking position illustrated in Figure 5, toward the pin 94 and to the unlocking position illustrated in Figure 7. When the pawls 82 are disengaged from tooth 90 the projection 64 engages the same tooth. Continuing rotation of the armature 28 and crank 44 along with latch 62 rotates the sprocket wheel 70 to the position illustrated in Figure 8 of the drawings. As the projection 64 is urged, under the impetus of rotation and the spring 56, to follow crank 44, the pawls 82 are released in the manner illustrated in Figure 9 of the drawings to again engage a tooth 90 and lock the sprocket wheel 70 against further rotation. The projection 92 functions against tooth 90 as a stop to limit the amount of urging that may be imposed by spring 96. As long as there is a torque rotation applied to crank 70 and latch 62 the projection 64 is urged between a pair of teeth 90 on the sprocket wheel 70 in the manner illustrated in Figure 10 of the drawings. However, as aforementioned, the pawls 82 lock the sprocket wheel 70 against further rotation. Therefore to ensure that subsequent steps of rotation may be applied to sprocket wheel 70 the torque motor 18 must be de-energized. When this occurs the spring 56 pulls the crank 44 back toward the latch 62 and at the same time the spring 56 pulls and urges the latch 62 toward the crank 44 resulting in the latch 62 assuming the original extended position as illustrated in Figure 11 of the drawings. The stepper motor is now in condition to have a reverse pulse imposed thereon, which would rotate the latch 62 and all related structure back through the operation just described, or a pulse can be imposed on electrical motor 18 to rotate the same in the identical direction just described which would bring into operation the next succeeding latch 62. It is to be understood, as may be determined by referring to the figures and above description of operation that only one step of rotation may be obtained at any one time and the distance of rotation is defined by teeth 90 on sprocket wheel 70.

While in order to comply with the statute, the invention has been described in language more or less specific as to structural features, it is to be understood that the invention is not limited to the specific features shown, but that the means of construction herein disclosed comprise a preferred form of putting the invention into effect, and the invention is therefore claimed in any of its forms or modifications within the legitimate and valid scope of the appended claims.

What is claimed is:

1. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied.

2. An incremental motor comprising a housing; a rotatable driving assembly in said housing having alternately torque and torque release applied thereto; a rotatable driven assembly actuated by said driving assembly; elements on said driven assembly for restricting the rotation of said driving assembly; means on said housing for limiting the rotation of said driven assembly and for locking said driven assembly against rotation when torque release is applied; and means on said driving assembly for unlocking said first named means and for rotating said driven assembly when torque is applied.

3. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; means on said driving assembly for unlocking said first named means and for rotating said driven assembly when torque is applied; and structure on said housing for directing the path of travel of said driving assembly.

4. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said driving assembly including an armature.

5. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said driving assembly including a latch assembly.

6. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said driving assembly including a crank.

7. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said driven assembly including a sprocket wheel.

8. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said driven assembly including a shaft partially disposed within a portion of said driven assembly and supported thereby.

9. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said first named means being at least one resilient pawl.

10. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said second named means being a resilient latch.

11. An incremental motor comprising a housing; a rotatable driving assembly in said housing having alternately torque and torque release applied thereto; a rotatable driven assembly actuated by said driving assembly; elements on said driven assembly for restricting the rotation of said driving assembly; means on said housing for limiting the rotation of said driven assembly and for locking said driven assembly against rotation when torque release is applied; and means on said driving assembly for unlocking said first named means and for rotating said driven assembly when torque is applied; said elements being a plurality of teeth.

12. An incremental motor comprising a housing; a rotatable driving assembly in said housing having alternately torque and torque release applied thereto; a rotatable driven assembly actuated by said driving assembly; means on said housing for limiting the rotation of said driven assembly when said member is energized and for locking said driven assembly against rotation when torque release is applied; means on said driving assembly for unlocking said first named means and for rotating said driven assembly when torque is applied; and structure on said housing for controlling the path of travel of said driving assembly; said structure being a cam ring.

13. An incremental motor comprising a housing; a rotatable driving assembly in said housing having alternately torque and torque release applied thereto; a rotatable driven assembly actuated by said driving assembly; means on said housing for limiting the rotation of said driven assembly and for locking said driven assembly against rotation when torque release is applied; and means on said driving assembly for unlocking said first named means and for rotating said driven assembly when torque is applied; said first named means being a pair of opposed resilient pawls.

14. An incremental motor comprising a housing, a member in said housing energized by electrical pulses transmitted thereto; a rotatable armature disposed within said housing and operatively interconnected to said member and actuated thereby when electrical pulses are transmitted thereto; said armature having an opening in a portion thereof; a driving assembly on said armature and rotatable therewith; a rotatable driven assembly actuated by said driving assembly when said member is energized; said driven assembly having a portion thereof disposed and supported in the opening in said armature; means on said housing for limiting the rotation of said driven assembly when said member is energized and for locking said driven assembly against rotation when said member is de-energized; and means on said driving assembly for unlocking said first named means and for rotating said driven assembly when said member is energized.

15. An incremental motor comprising a housing, a member in said housing energized by electrical pulses transmitted thereto; a rotatable armature disposed within said housing and operatively interconnected to said member and actuated thereby when electrical pulses are transmitted thereto; said armature having an opening in a portion thereof; a driving assembly on said armature and rotatable therewith; a rotatable driven assembly actuated by said driving assembly when said member is energized; said driven assembly having a portion thereof disposed and supported in the opening in said armature; means on said housing for limiting the rotation of said driven assembly when said member is energized and for locking said driven assembly against rotation when said member is de-energized; and means on said driving assembly for unlocking said first named means and for rotating said driven assembly when said member is energized; said driving assembly including a latch assembly.

16. An incremental motor comprising a housing; a member in said housing energized by electrical pulses transmitted thereto; a rotatable armature disposed within said housing and operatively interconnected to said member and actuated thereby when electrical pulses are transmitted thereto; said armature having an opening in a portion thereof; a driving assembly on said armature and rotatable therewith; a rotatable driven assembly actuated by said driving assembly when said member is energized; said driven assembly having a portion thereof disposed and supported in the opening in said armature; means on said housing for limiting the rotation of said driven assembly when said member is energized and for locking said driven assembly against rotation when said member is de-energized; and means on said driving assembly for unlocking said first named means and for rotating said driven assembly when said member is energized; said driving assembly including a crank.

17. An incremental motor comprising a housing; a member in said housing energized by electrical pulses transmitted thereto; a rotatable armature disposed within said housing and operatively interconnected to said member and actuated thereby when electrical pulses are transmitted thereto; said armature having an opening in a portion thereof; a driving assembly on said armature and rotatable therewith; a rotatable driven assembly actuated by said driving assembly when said member is energized; said driven assembly having a portion thereof disposed and supported in the opening in said armature; means on said housing for limiting the rotation of said driven assembly when said member is energized and for locking said driven assembly against rotation when said member is de-energized; and means on said driving assembly for unlocking said first named means and for rotating said driven assembly when said member is energized; said first named means being at least one resilient pawl.

18. An incremental motor comprising a housing; a member in said housing energized by electrical pulses transmitted thereto; a rotatable armature disposed within said housing and operatively interconnected to said member and actuated thereby when electrical pulses are transmitted thereto; said armature having an opening in a portion thereof; a driving assembly on said armature and rotatable therewith; a rotatable driven assembly actuated by said driving assembly when said member is energized; said driven assembly having a portion thereof disposed and supported in the opening in said armature; means on said housing for limiting the rotation of said driven assembly when said member is energized and for locking said driven assembly against rotation when said member is de-energized; and means on said driving assembly for unlocking said first named means and for rotating said driven assembly when said member is energized; said first named means being a pair of opposed resilient pawls.

19. An incremental motor comprising a housing; a member in said housing energized by electrical pulses transmitted thereto; a rotatable armature disposed within said housing and operatively interconnected to said member and actuated thereby when electrical pulses are transmitted thereto; said armature having an opening in a portion thereof; a driving assembly on said armature and rotatable therewith; a rotatable driven assembly actuated by said driving assembly when said member is energized; said driven assembly having a portion thereof disposed and supported in the opening in said armature; means on said housing for limiting the rotation of said driven assembly when said member is energized and for locking said driven assembly against rotation when said member is de-energized; and means on said driving assembly for unlocking said first named means and for rotating said driven assembly when said member is energized; said second named means being a resilient latch.

No references cited.